(12) United States Patent
Wei et al.

(10) Patent No.: US 10,419,661 B2
(45) Date of Patent: Sep. 17, 2019

(54) SHOOTING METHOD AND SHOOTING DEVICE

(71) Applicant: Nubia Technology Co., Ltd., Guangdong (CN)

(72) Inventors: Qiang Wei, Guangdong (CN); Xiaohui Cui, Guangdong (CN); Lei Miao, Guangdong (CN); Qiang Li, Guangdong (CN); Qian Hai, Guangdong (CN)

(73) Assignee: Nubia Technology Co., Ltd., Shenzhen (CN)

( * ) Notice: Subject to any disclaimer, the term of this patent is extended or adjusted under 35 U.S.C. 154(b) by 288 days.

(21) Appl. No.: 15/506,306

(22) PCT Filed: Jul. 21, 2015

(86) PCT No.: PCT/CN2015/084707
§ 371 (c)(1),
(2) Date: Feb. 24, 2017

(87) PCT Pub. No.: WO2016/029756
PCT Pub. Date: Mar. 3, 2016

(65) Prior Publication Data
US 2017/0257561 A1  Sep. 7, 2017

(30) Foreign Application Priority Data
Aug. 28, 2014  (CN) .......................... 2014 1 0431334

(51) Int. Cl.
*H04N 5/232* (2006.01)
*G03B 15/05* (2006.01)
(Continued)

(52) U.S. Cl.
CPC ......... *H04N 5/23222* (2013.01); *G03B 15/05* (2013.01); *H04N 5/2257* (2013.01);
(Continued)

(58) Field of Classification Search
CPC ............... H04N 5/23222; H04N 5/272; H04N 5/23296; H04N 5/23216; H04N 5/2621;
(Continued)

(56) References Cited

U.S. PATENT DOCUMENTS

| 2013/0162856 A1* | 6/2013 | Song | G06F 3/04845 348/222.1 |
| 2014/0313367 A1* | 10/2014 | Iwasaki | H04N 5/2351 348/222.1 |
| 2014/0347519 A1* | 11/2014 | Yamamoto | H04N 5/235 348/231.99 |

FOREIGN PATENT DOCUMENTS

| CN | 103327253 A | 9/2013 |
| CN | 103888683 A | 6/2014 |

(Continued)

OTHER PUBLICATIONS

PCT International Search Report and Written Opinion for PCT Application No. PCT/CN2015/084707 dated Sep. 2, 2015 (9 pages).

*Primary Examiner* — Nelson D. Hernández Hernández
(74) *Attorney, Agent, or Firm* — Eversheds Sutherland (US) LLP (57) ABSTRACT

A shooting method and a shooting device are disclosed. In general, the shooting method includes the following steps: continuously capturing images; reading a captured image of the captured images and searching in the current read image according to a predetermined criteria to identify a Light Painting region of the current read image; and extracting the Light Painting region and merging the Light-Painting region and a corresponding position of a base image to achieve a synthesized image, and using the synthesized image as a base image for next image synthesis. Since only the Light Painting region is merged and synthesized, and other light spot regions in the image would not appear in the synthesized image, and it would not contaminate the synthesized (Continued)

image, a clear Light Painting trajectory can be recorded in the finally synthesized image.

9 Claims, 4 Drawing Sheets

(51) Int. Cl.
*H04N 5/225* (2006.01)
*H04N 5/262* (2006.01)
*H04N 5/272* (2006.01)

(52) U.S. Cl.
CPC ..... *H04N 5/23216* (2013.01); *H04N 5/23245* (2013.01); *H04N 5/23248* (2013.01); *H04N 5/23293* (2013.01); *H04N 5/23296* (2013.01); *H04N 5/2621* (2013.01); *H04N 5/272* (2013.01)

(58) Field of Classification Search
CPC ........... H04N 5/23293; H04N 5/23248; H04N 5/23245; H04N 5/2257; G03B 15/05
See application file for complete search history.

(56) References Cited

FOREIGN PATENT DOCUMENTS

| | | | |
|---|---|---|---|
| CN | 103973984 | A | 8/2014 |
| CN | 104159040 | A | 11/2014 |
| CN | 104202521 | A | 12/2014 |
| JP | 2005123824 | A | 5/2005 |

\* cited by examiner

SHOOTING METHOD AND SHOOTING DEVICE

TECHNICAL FIELD

The present disclosure relates to the technical field of photographic technology, in particular to a shooting method and a shooting device.

BACKGROUND

In recent years, a Light Painting shooting mode has emerged and users can use Light Painting shooting to perform artistic creation. The Light Painting shooting refers to a shooting mode in which a special image is made by moving a light source while taking a long exposure photograph. Since long exposure is needed, corresponding light sensing hardware is needed to provide a support. However, the light sensing hardware that can support long exposure is relatively expensive, only professional photographic devices such as single-lens reflex cameras are provided with the light sensing hardware, and digital shooting devices such as digital cameras and mobile phones are impossibly provided with such expensive hardware device.

In order to realize Light Painting shooting on a digital shooting device, a solution of continuously capturing image data via a camera and performing an add operation to the current image data and past image data to generate a synthesized image is provided in the related art. The shooting device thereby is rendered to not rely on the light sensing hardware to perform long exposure but to simulate long exposure by adopting an image superposition synthesis technique, and thus a Light Painting shooting function is realized on the digital shooting device.

However, since the Light Painting shooting has the criteria of merging all light spots in a shooting environment, thereby recording a Light Painting trajectory in a finally obtained image, no matter whether it is a professional shooting device or a digital shooting device, Light Painting shooting can be performed only under dark shooting environments; in case of bright shooting environments, the finally obtained image has not only Light Painting light spots but also a great number of other light spots that contaminate the image, and consequently a clear Light Painting trajectory cannot be obtained.

As a result, the relevant shooting devices can only perform Light Painting shooting under a dark shooting environment (for example, at night) and cannot perform Light Painting shooting at a bright shooting environment (for example, at daytime), the demand of a user for Light Painting creation anytime and anywhere cannot be satisfied and the user experience is not good.

SUMMARY

The main object of the present disclosure is to provide a shooting method and a shooting device, so as to realize that Light Painting shooting can also be performed under a bright shooting environment, satisfy the demand of a user for Light Painting creation anytime and anywhere and improve the user experience.

In order to achieve the object, the following technical solution is adopted:

A shooting method includes the following steps:
continuously capturing a sequence of images;
obtaining a current captured image and searching in the current captured image according to a predetermined criteria to determine a Light Painting region in the current captured image; and
extracting the Light Painting region in the current captured image, merging the Light Painting region and a corresponding position of a base image to generate a synthesized image, and using the synthesized image as the base image for next image synthesis;
herein, if the current captured image is a first captured image, the base image is a predetermined as background image.

Alternatively, the step of searching in the current captured image according to a predetermined criteria to determine a Light Painting region in the current captured image includes:
searching for an assistant object matching with a predetermined criteria of the assistant object in the current captured image; and
determining a light spot region at a light-emitting position of the assistant object as the Light Painting region.

Alternatively, the step of determining a light spot region at a light-emitting position of the assistant object as the Light Painting region includes:
comparing brightness value of a region close to the light-emitting position with brightness value of the base image, and if a difference value between the brightness value of the region close to the light-emitting position and the brightness value of the base image is greater than a predetermined threshold value, determining the region close to the light-emitting position as the "light spot region", and determining the region as the Light Painting region.

Alternatively, the step of searching in the current captured image according to a predetermined criteria to determine a Light Painting region in the current captured image includes:
if the current captured image is the first captured image, determining the Light Painting region of the current captured image according to a predetermined criteria of a Light Painting light spot and a predetermined position of a Light Painting region or a user-specified position of a Light Painting region; and
if the current captured image is not the first captured image, according to the predetermined criteria of the Light Painting light spot and a stored position of a previous Light Painting region.

Alternatively, the step of determining the Light Painting region of the current captured image according to a predetermined criteria of a Light Painting light spot and a predetermined position of a Light Painting region or a user-specified position of a Light Painting region includes:
searching, in the current captured image, for all Light Painting light spots matching with the predetermined criteria of the Light Painting light spot within a predetermined range of a position corresponding to the predetermined position of the Light Painting region or the user-specified position of the Light Painting region, and determining a region where the all Light Painting light spots are located as the Light Painting region.

Alternatively, the step of according to the predetermined criteria of the Light Painting light spot and a stored position of a previous Light Painting region includes:
searching, in the current captured image, for all Light Painting light spots matching with the predetermined criteria of the Light Painting light spot within a predetermined range of a position corresponding to the position of the previous Light Painting region, and determining a region where the all Light Painting light spots are located as the Light Painting region.

A shooting device includes an image acquisition module, an image synthesis module and a base image determination module, herein:

the image acquisition module is arranged to continuously capture a sequence of images;

the image synthesis module is arranged to: obtain a current captured image and search in the current captured image according to a predetermined criteria to determine a Light Painting region in the current captured image; and extract the Light Painting region in the current captured image and merge the Light Painting region and a corresponding position of a base image to generate a synthesized image; and the base image determination module is arranged to: if the current captured image is a first captured image, determine a predetermined background image as the base image; and if the current captured image is not the first captured image, use a previous synthesized image generated by the image synthesis module as the base image for next image synthesis.

Alternatively, the image synthesis module is arranged to search in the current captured image according to the predetermined criteria to determine the Light Painting region in the current captured image in a way as follows:

searching for an assistant object matching with the predetermined criteria of the assistant object in the current captured image; and determining a light spot region at a light-emitting position of the assistant object as the Light Painting region.

Alternatively, the image synthesis module is arranged to determine the light spot region at the light-emitting position of the assistant object as the Light Painting region in a way as follows:

comparing brightness value of a region close to the light-emitting position with brightness value of the base image, and if a difference value between the brightness value of the region close to the light-emitting position and the brightness value of the base image is greater than a predetermined threshold value, determining the region close to the light-emitting position as the "light spot region", and determining the region as the Light Painting region.

Alternatively, the image synthesis module is arranged to search in the current captured image according to the predetermined criteria to determine the Light Painting region in the current captured image in a way as follows:

if the current captured image is the first captured image, determining the Light Painting region of the current captured image according to a predetermined criteria of a Light Painting light spot and a predetermined position of a Light Painting region or a user-specified position of a Light Painting region; and if the current captured image is not the first captured image, according to the predetermined criteria of the Light Painting light spot and a stored position of a previous Light Painting region.

Alternatively, the image synthesis module is arranged to determine the Light Painting region of the current captured image according to the predetermined criteria of the Light Painting light spot and the predetermined position of the Light Painting region or the user-specified position of the Light Painting region in a way as follows:

searching, in the current captured image, for all Light Painting light spots matching with the predetermined criteria of the Light Painting light spot within a predetermined range of a position corresponding to the predetermined position of the Light Painting region or the user-specified position of the Light Painting region, and determining a region where the all Light Painting light spots are located as the Light Painting region.

Alternatively, the image synthesis module is arranged to according to the predetermined criteria of the Light Painting light spot and the stored position of the previous Light Painting region in a way as follows:

searching, in the current captured image, for all Light Painting light spots matching with the predetermined criteria of the Light Painting light spot within a predetermined range of a position corresponding to the position of the previous Light Painting region, and determining a region where the all Light Painting light spots are located as the Light Painting region.

A computer program includes a program instruction, the program instruction, when being executed by a computer, enabling the computer to execute any of the above shooting method.

A carrier carries the above computer program.

The shooting method provided by the technical solution of the present disclosure tracks the assistant object or the Light Painting light spot itself, and then recognizes the Light Painting region in the image according to the assistant object or the Light Painting light spot, and finally extracts the Light Painting region to perform superposition synthesis. Since only the Light Painting region is merged and synthesized, and other light spot regions in the image would not appear in the synthesized image, and would not contaminate the synthesized image, a clear Light Painting trajectory can be recorded in the finally synthesized image, achieving Light Painting shooting under a bright shooting environment, widening the application scenarios of Light Painting shooting, satisfying the demand of a user for Light Painting creation anytime and anywhere, and improving the user experience.

The realization of an object, function features and advantages of the present disclosure will be further described in combination with the embodiments and with reference to the drawings.

DETAILED DESCRIPTION

It shall be understood that the specific embodiments described here are only used for explaining the present disclosure instead of limiting the present disclosure.

A shooting method provided by an embodiment of the present disclosure is mainly applied to Light Painting shooting, and may also be applied to application scenarios similar to Light Painting shooting, and the application scenarios are not limited here. The following embodiment will be described in detail by taking Light Painting shooting as an example.

Figure 1:
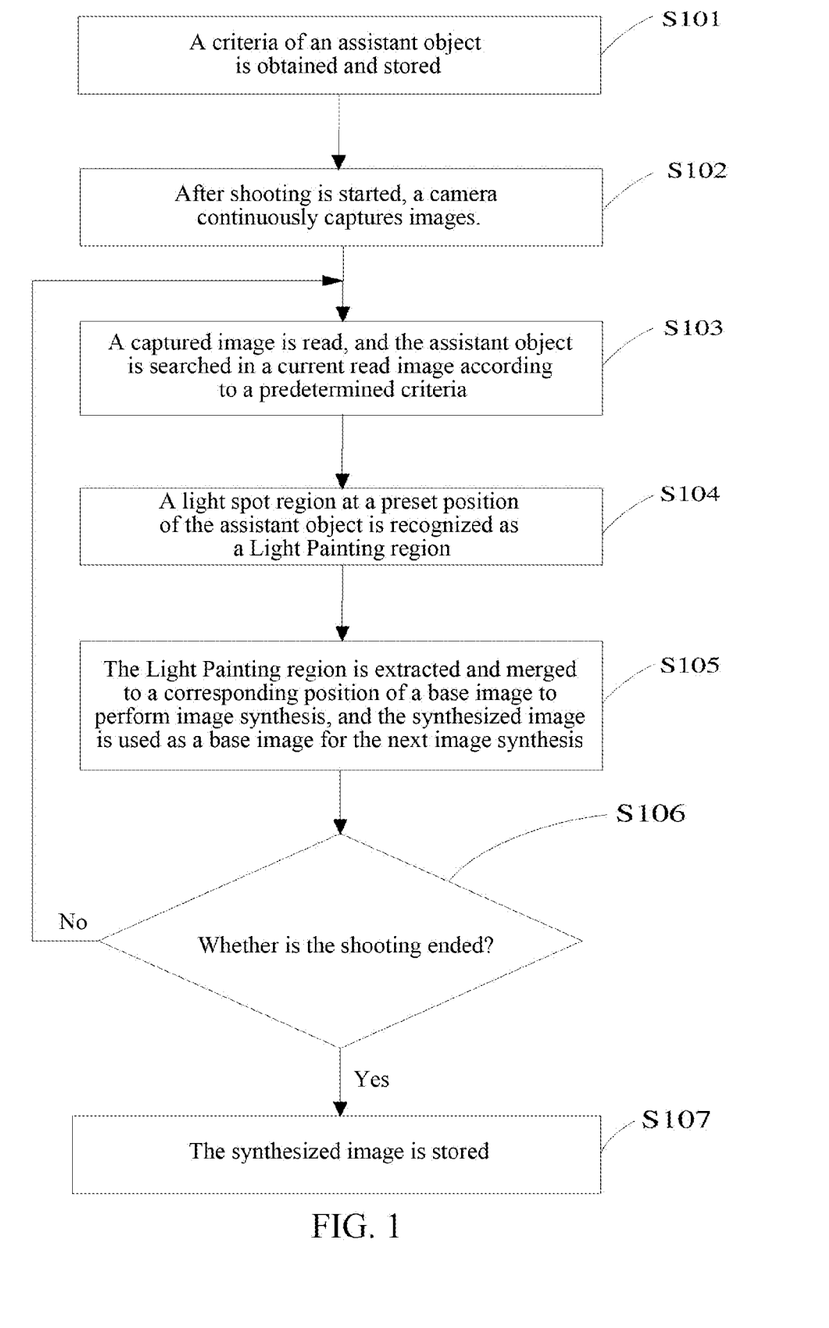
FIG. 1 illustrates a flowchart of a first embodiment of a shooting method of the present disclosure.

Referring to FIG. 1, a first embodiment of the shooting method of the present disclosure is provided, and the shooting method includes the following steps:

In step S101, the criteria of an assistant object are obtained and the criteria of the assistant object is stored before shooting is started.

Alternatively, a shooting device may directly obtain existing criteria data from outside, and may also prompt a user to select the assistant object on a preview interface, and extract and store the criteria data of the assistant object selected by the user.

It is appropriate for the assistant object to have the obvious criteria to facilitate the shooting device to track the assistant object according to a criteria parameter in a subsequent shooting process. The assistant object may be a Light Painting pen, a human finger or a combination thereof, and the assistant object may be any object that can emit light.

In step S102, after the shooting is started, a camera continuously captures images;

after the user selects a Light Painting shooting mode and presses a shooting key or triggers a virtual shooting key, the shooting device starts to perform Light Painting shooting and uses the camera to continuously capture images, and the speed that the camera continuously captures the images may be preset.

In step S103, a current captured image is obtained and the assistant object is searched from the current captured image according to the predetermined criteria of the assistant object.

The shooting device continuously or discontinuously reads captured images and searches for the assistant object matching with the predetermined criteria from the current read image to realize the tracking of the assistant object.

The camera continuously captures images, and in this embodiment of the present disclosure, processing in steps S103-S107 is performed to each captured image, and special processing needs to be only performed to a first captured image, and see the depiction below for details.

In step S104, a Light Painting region is determined according to the assistant object.

Alternatively, a light spot region at a light-emitting position of the assistant object is determined as the Light Painting region.

Alternatively, the step that a light spot region at a light-emitting position of the assistant object is determined as the Light Painting region includes that: brightness value of a region close to the light-emitting position is compared with brightness value of a base image, and if a difference value between the brightness value of the region close to the light-emitting position and the brightness value of the base image is greater than a predetermined threshold value, the region close to the light-emitting position is considered as the "light spot region", and the region is determined as the Light Painting region.

Alternatively, if the current captured image is the first captured image, the base image is a predetermined background image; and if the current captured image is not the first captured image, the base image is a previous synthesized image generated by merging the Light Painting region and a corresponding position of the base image, i.e., the synthesized image generated in step S105.

Alternatively, when the assistant object is a Light Painting pen, the shooting device searches for a light spot region (referring to the depiction above, a region with greater brightness value than a threshold value) at a light-emitting position of the Light Painting pen, i.e., a top end of the Light Painting pen, and determines the searched light spot region as the Light Painting region.

In step S105, a Light Painting region in the current captured image is extracted, the Light Painting region and a corresponding position of the base image are merged to generate a synthesized image, and the synthesized image is used as a base image for next image synthesis.

Alternatively, this step includes that: the shooting device obtains a coordinate position of the Light Painting region in the original image and extracts the Light Painting region, and then merges the Light Painting region and the corresponding coordinate position of the base image to synthesize the Light Painting region in the base image.

Alternatively, this step includes that: if the current read image is the first captured image, the image is directly used as the base image for the next image synthesis, a background of a finally synthesized Light Painting picture being a shooting scene background. In this embodiment of the present disclosure, the previous synthesized image must be used as the base image such that the information of each captured image can be saved. This process is equivalent to extracting the Light Painting region of each captured image and synthesizing the Light Painting region onto a predetermined image, and thus the information of all captured images is recorded.

Or, the user is allowed to predetermined a background image, and this background image may be selected from the existing pictures, and a picture taken at the scene may also be used as the background image. If the current read image is the first captured image, the predetermined background image is used as the base image for this image synthesis, the Light Painting region of the first image is extracted and the Light Painting region of the first image and the corresponding position of the predetermined background image are merged, and thus any background may be set for the Light Painting picture.

After one image synthesis is completed, this synthesized image may be displayed in real time through a display screen.

In step S106, whether the shooting is ended is judged.

If the shooting is ended, it is to proceed to step S107; otherwise, it is to return to step S103, the captured images are continuously read to perform the next image synthesis, and cyclic operations are performed accordingly. The image acquisition and the image synthesis are simultaneously performed, and since the camera continuously captures the images, the synthesized image is also continuously generated in real time.

In step S107, the synthesized image is stored.

After the shooting is ended, the finally synthesized image is stored, and the finally synthesized image namely is the finally synthesized Light Painting picture.

Thus, the assistant object is tracked, the Light Painting region in the image is determined according to the assistant object, and the Light Painting region is extracted to perform superposition synthesis. Since only the Light Painting region is merged and synthesized, and other light spot regions in the image would not appear in the synthesized image, and would not contaminate the synthesized image, a clear Light Painting trajectory can be recorded in the finally synthesized image, achieving Light Painting shooting under a bright shooting environment.

Figure 2:
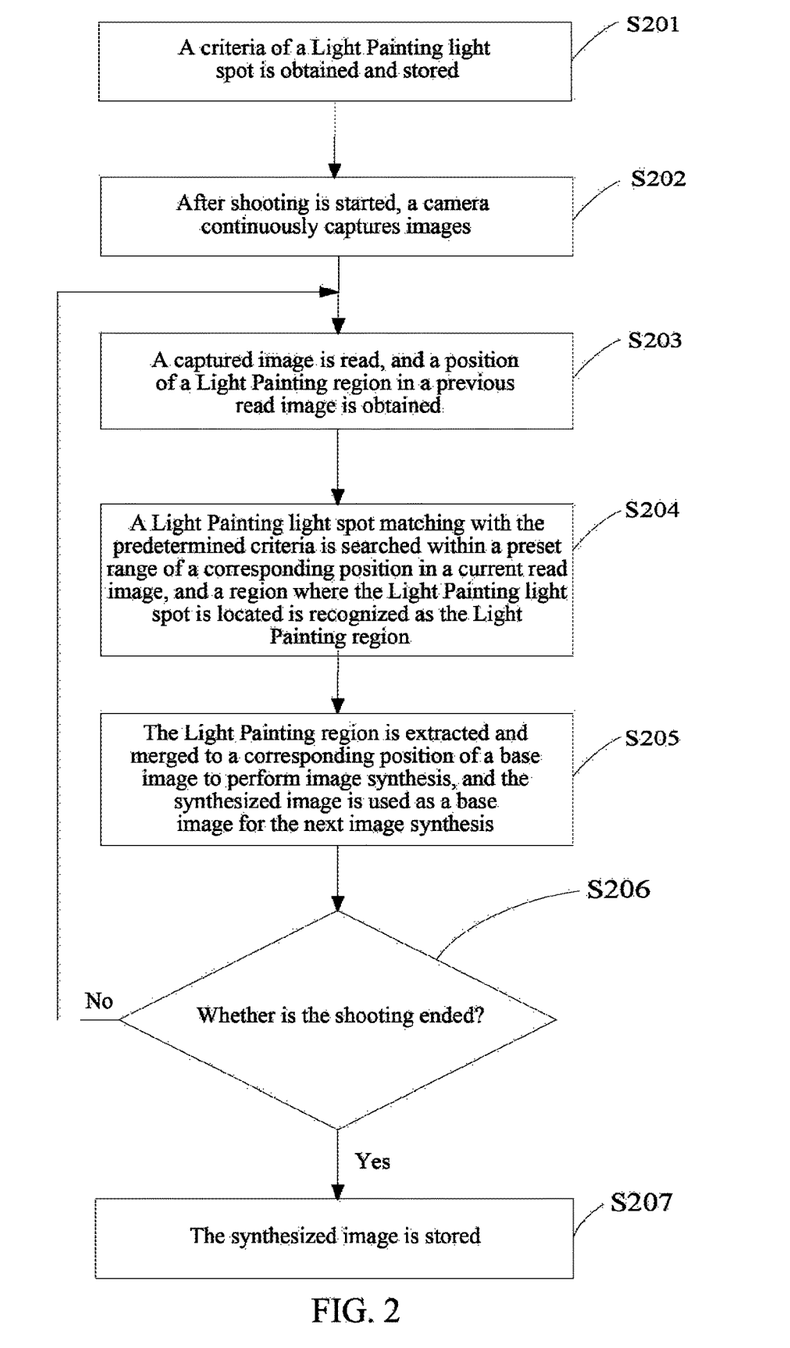
FIG. 2 illustrates a flowchart of a second embodiment of a shooting method of the present disclosure.

Referring to FIG. 2, a second embodiment of the shooting method of the present disclosure is provided, and the shooting method may include the following steps:

In step S201, the criteria of a Light Painting light spot is obtained and the criteria of the Light Painting light spot is stored before shooting is started.

Before the shooting is started, a shooting device may directly obtain existing criteria data from outside, and may also prompt a user to select a Light Painting light spot on a preview interface, and extract and store the criteria of the Light Painting light spot selected by the user. The criteria of the Light Painting light spot includes brightness value, area, outline, diameter and the like of the light spot. The Light Painting light spot namely is a light spot generated by light emitted by a Light Painting pen.

In this embodiment, the criteria of the Light Painting light spot is predetermined to facilitate subsequent direct tracking of the Light Painting light spot.

In step S202, when the shooting is started, a camera starts to continuously capture images.

In step S203, a current captured image is obtained.

In step S204, a Light Painting region of the current captured image is determined according to the predetermined criteria of the Light Painting light spot and a stored position of a previous Light Painting region or according to the predetermined criteria of the Light Painting light spot and a predetermined position of a Light Painting region or a user-specified position of a Light Painting region.

Alternatively, this step includes that: if the current captured image is the first captured image, the Light Painting region of the current captured image is determined according to the predetermined criteria of the Light Painting light spot and the predetermined position of the Light Painting region or the user-specified position of the Light Painting region, and specifically includes that:

in the current captured image, all Light Painting light spots matching with the predetermined criteria of the Light Painting light spot are searched within a predetermined range of a position corresponding to the predetermined position of the Light Painting region or the user-specified position of the Light Painting region, and a region where the all Light Painting light spots are located is determined as the Light Painting region;

if the current captured image is not the first captured image, the Light Painting region of the current captured image being determined according to the predetermined criteria of the Light Painting light spot and the stored position of the previous Light Painting region, includes that: in the current captured image, all Light Painting light spots matching with the predetermined criteria of the Light Painting light spot are searched within a predetermined range of a position corresponding to the position of the previous Light Painting region, and a region where the all Light Painting light spots are located is determined as the Light Painting region;

alternatively, the shooting device may cache the position (e.g. coordinate position) of the Light Painting region in this captured image during each image synthesis, such that the information in the cache can be directly used as the position of the previous Light Painting region in the next image synthesis; or the shooting device may also use the position of the tail end of a Light Painting trajectory in a base image as the position of the previous Light Painting region. Therein, the meaning of the base image is the same as the meaning in the first embodiment and thus is not repeated here.

In Light Painting creation, the moving trajectory of the Light Painting light spot is regular and continuous, and thus the Light Painting light spots in two adjacent captured images are close to each other and would not be very far away from each other. Therefore, when the Light Painting light spot is tracked in this embodiment, searching is only performed within the predetermined range of the position of the Light Painting region in the previous image, so as to avoid misjudging a light spot of other regions as the Light Painting light spot, thereby improving the efficiency.

In step S205, the Light Painting region in the current captured image is extracted, the Light Painting region and a corresponding position of the base image are merged to generate a synthesized image, and the synthesized image is used as a base image for the next image synthesis.

If the current captured image is the first captured image, the base image is a predetermined background image; and if the current captured image is not the first captured image, the base image is a previous synthesized image generated by merging the Light Painting region and a corresponding position of the base image, i.e., a synthesized image generated in step S205.

In step S206, whether the shooting is ended is judged.

If the shooting is ended, it is to proceed to step S207; otherwise, it is to return to step S203, the captured image is continuously read to perform the next image synthesis, and cyclic operations are performed accordingly. The image acquisition and the image synthesis are simultaneously performed, and since the camera continuously captures images, the synthesized image is also continuously generated in real time.

In step S207, the synthesized image is stored.

After the shooting is ended, the finally synthesized image is stored and the finally synthesized image namely is the finally synthesized Light Painting picture.

Thus, the Light Painting light spot is directly tracked, the Light Painting region in the image is recognized according to the Light Painting light spot, and the Light Painting region is extracted to perform superposition synthesis. Since only the Light Painting region is merged and synthesized, and other light spot regions in the image would not appear in the synthesized image and would not contaminate the synthesized image, a clear Light Painting trajectory can be recorded in the finally synthesized image, achieving Light Painting shooting under a bright shooting environment.

Figure 3:
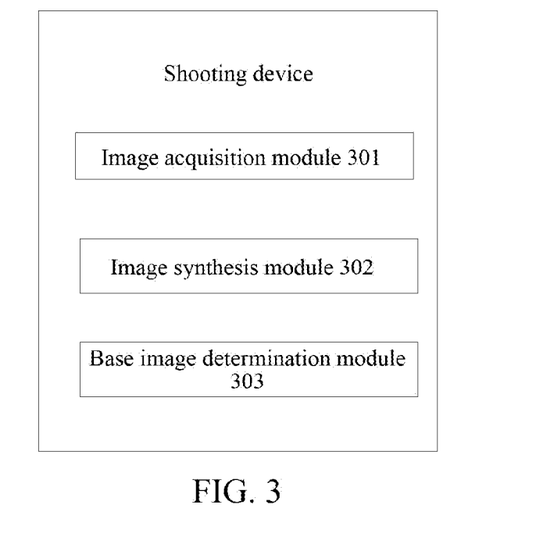
FIG. 3 illustrates a schematic diagram of modules of one embodiment of a shooting device of the present disclosure.

Referring to FIG. 3, one embodiment of a shooting device of the present disclosure is provided, the shooting device may be a common digital camera such as a card camera, and may also be a terminal device such as a mobile phone or a tablet computer having a shooting function, and the shooting device is a shooting device for realizing the above shooting method, and includes an image acquisition module 301, an image synthesis module 302 and a base image determination module 303, herein, the image acquisition module 301 is arranged to call a camera to capture an image.

After the user selects a Light Painting shooting mode and presses a shooting key or triggers a virtual shooting key, the shooting device starts to perform Light Painting shooting and the image acquisition module 301 uses the camera to continuously capture images, and the speed that the camera continuously captures the images may be preset.

The image synthesis module 302 is arranged to continuously or discontinuously obtain the captured image and search in the current read image according to a predetermined criteria to recognize a Light Painting region in the current captured image; and extract and merge the Light Painting region and a corresponding position of a base image to generate a synthesized image, and use the synthesized image as the base image for the next image synthesis.

The base image determination module 303 is arranged to: if the current captured image is a first captured image, determine a predetermined background image as the base image; and if the current captured image is not the first image of the captured image, use the previous synthesized image generated by the image synthesis module 302 as the base image for the next image synthesis.

Alternatively, the image synthesis module 302 is arranged to search in the current captured image according to the predetermined criteria to determine the Light Painting region in the current captured image in a way as follows:

an assistant object matching with the predetermined criteria of the assistant object is searched in the current captured image; and a light spot region at a light-emitting position of the assistant object is determined as the Light Painting region.

Alternatively, the image synthesis module 302 is arranged to determine the light spot region at the light-emitting position of the assistant object as the Light Painting region in a way as follows:

brightness value of a region close to the light-emitting position is compared with brightness value of the base image, and if a difference value between the brightness value of the region close to the light-emitting position and the brightness value of the base image is greater than a predetermined threshold value, the region close to the light-emitting position is considered as the "light spot region", and the region is determined as the Light Painting region.

Alternatively, the image synthesis module 302 is arranged to search in the current captured image according to the predetermined criteria to determine the Light Painting region in the current captured image in a way as follows:

if the current captured image is the first captured image, the Light Painting region of the current captured image is determined according to a predetermined criteria of a Light Painting light spot and a predetermined position of a Light Painting region or a user-specified position of a Light Painting region; and if the current captured image is not the first captured image, according to the predetermined criteria of the Light Painting light spot and a stored position of a previous Light Painting region.

Alternatively, the image synthesis module 302 is arranged to determine the Light Painting region of the current captured image according to the predetermined criteria of the Light Painting light spot and the predetermined position of the Light Painting region or the user-specified position of the Light Painting region in a way as follows:

in the current captured image, all Light Painting light spots matching with the predetermined criteria of the Light Painting light spot are searched within a predetermined range of a position corresponding to the predetermined position of the Light Painting region or the user-specified position of the Light Painting region, and a region where the all Light Painting light spots are located is determined as the Light Painting region.

Alternatively, the image synthesis module 302 is arranged to according to the predetermined criteria of the Light Painting light spot and the stored position of the previous Light Painting region in a way as follows:

in the current captured image, all Light Painting light spots matching with the predetermined criteria of the Light Painting light spot are searched within a predetermined range of a position corresponding to the position of the previous Light Painting region, and a region where the all Light Painting light spots are located is determined as the Light Painting region.

In some embodiments, the image synthesis module 302 may recognize the Light Painting region in the image by tracking an assistant object.

Specifically, before shooting is started, a shooting device may directly obtain existing criteria data of the assistant object from outside, and may also prompt a user to select the assistant object on a preview interface, and extract and store the criteria data of the assistant object selected by the user. It is appropriate for the assistant object to have the obvious criteria to facilitate the shooting device to track the assistant object according to a criteria parameter in a subsequent shooting process. The assistant object may be a Light Painting pen, a human finger or a combination thereof, and the Light Painting pen may be any object that can emit light. The image synthesis module reads the captured image, searches for the assistant object matching with the predetermined criteria from the current read image, and recognizes the light spot region at the pre-set position of the assistant object as the Light Painting region. For example, when the assistant object is a Light Painting pen, the image synthesis module searches for a light spot region (referring to the depiction above, a region with greater brightness value than a threshold value) at a light-emitting position of a top end of the Light Painting pen, and recognizes the searched light spot region as the Light Painting region.

In other embodiments, the image synthesis module 302 recognizes the Light Painting region in the image by directly tracking the Light Painting light spot itself.

Specifically, before the shooting is started, the shooting device may directly obtain existing criteria data of the Light Painting light spot from outside, and may also prompt a user to select a Light Painting light spot on a preview interface, and extract and store the criteria data of the Light Painting light spot selected by the user. The criteria of the Light Painting light spot includes brightness value, area, outline, diameter and the like of the light spot. The image synthesis module reads the captured images, obtains the position of the Light Painting region in the previous read image, searches for the Light Painting light spot matching with the predetermined criteria within the predetermined range of a corresponding position in the current read image, and recognizes the region where the Light Painting light spot is located as the Light Painting region. Alternatively, the image synthesis module may cache the position of the Light Painting region in this read image in each image synthesis, such that the position of the Light Painting region in the previous image captured from the cache is directly obtained. Or, the image synthesis module may also use the position of the tail end of a Light Painting trajectory in the base image as the position of the Light Painting region in the previous image.

During image synthesis, the image synthesis module 302 obtains a coordinate position of a Light Painting region in the original image and extracts the Light Painting region, and then merges the Light Painting region and the corresponding coordinate position of the base image to synthesize the Light Painting region in the base image. Alternatively, if the current read image is the first captured image, the image is directly used as the base image for the next image synthesis, and a background of a finally synthesized Light Painting picture is a shooting scene background. Or, the user is allowed to preset a background image, this background image may be selected from existing pictures, and a picture taken at the scene may also be used as the background image. If the current read image is the first captured image, the predetermined background image is used as the base image for this image synthesis, the Light Painting region of the first image is extracted and merged to the corresponding position of the predetermined background image, and thus any background may be set for the Light Painting picture.

After one image synthesis is completed, this synthesized image may be displayed in real time through a display screen. Meanwhile, the captured image is continuously read to perform the next image synthesis, and cyclic operations are performed accordingly to finally obtain the finally synthesized Light Painting picture. The image acquisition and the image synthesis are simultaneously performed, and since the camera continuously captures the images, the synthesized image is also continuously generated in real time.

Accordingly, the shooting device provided by the embodiment of the present disclosure tracks the assistant object or the Light Painting light spot itself, recognizes the Light Painting region in the image according to the assistant object or the Light Painting light spot, and extracts the Light Painting region to perform superposition synthesis. Since only the Light Painting region is merged and synthesized, and other light spot regions in the image would not appear in the synthesized image, and would not contaminate the synthesized image, a clear Light Painting trajectory can be recorded in the finally synthesized image, achieving Light Painting shooting under a bright shooting environment, widening the application scenarios of Light Painting shooting, satisfying the demand of a user for Light Painting creation anytime and anywhere, and improving the user experience.

It needs to be stated that, when the shooting device provided by the embodiment performs shooting, the illustration is made only by taking the division of function modules as an example, and in actual application, the above functions may be completed by different function modules according to needs. In addition, the shooting device provided by the embodiment and the shooting method embodiment belong to the same invention concept. Referring to the method embodiment for the specific implementation process, and it is thus not repeated here.

One skilled in the art may understand that all or part of the steps in the method of the above embodiment may be completed by a program controlling relevant hardware, and the program may be stored in a computer-readable storage medium such as an ROM/RAM, a magnetic disk or a compact disk.

The embodiment of the present disclosure further provides a computer program including a program instruction, the program instruction, when being executed by a computer, enabling the computer to execute any one of the above shooting methods.

The embodiment of the present disclosure further provides a carrier carrying the computer program.

In this embodiment, the shooting device in actual application may be implemented by a digital camera or a device having a camera (e.g. a mobile phone, a tablet computer or a notebook computer); both the image acquisition module 301 and the image synthesis module 302 in the shooting device in actual application may be implemented by a Central Processing Unit (CPU), a Digital Signal Processor (DSP) or a Field Programmable Gate Array (FPGA) in the shooting device; and the memory module in the shooting device in actual application may be implemented by a memory in the shooting device.

Figure 4:
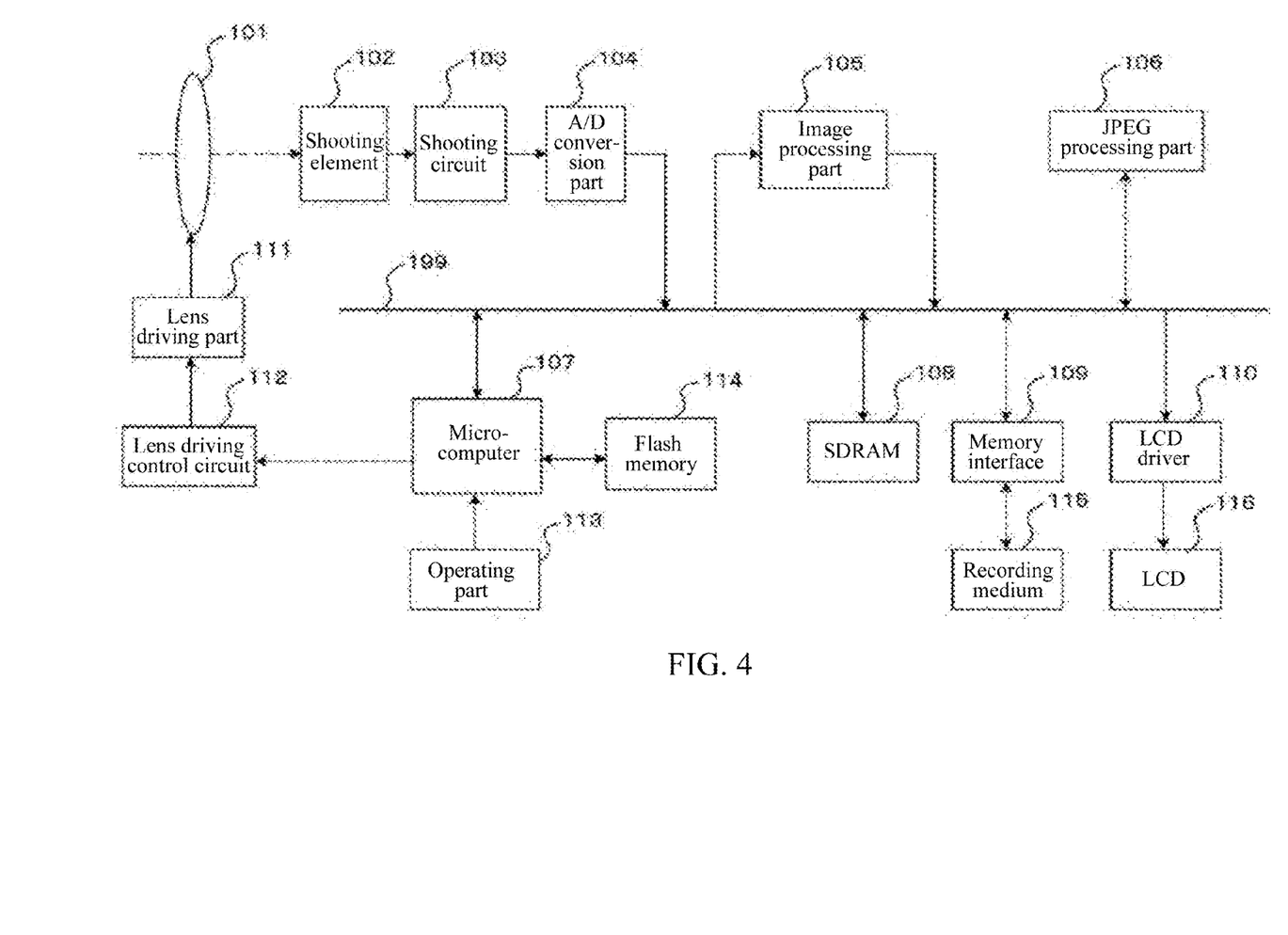
FIG. 4 illustrates a block diagram of an electrical structure of a camera of an embodiment of the present disclosure.

FIG. 4 illustrates a block diagram of an electrical structure of a camera of one embodiment of the present disclosure, herein:

a shooting lens 101 is composed of a plurality of optical lenses used for forming a shot object image, and is a single focus lens or a zoom lens. The shooting lens 101 can move in an optical axis direction via a lens driving part 111, a focus position of the shooting lens 101 is controlled according to a control signal from a lens driving control part 112, and in case of a zoom lens, a focal distance is also controlled. The lens driving control circuit 112 performs driving control of the lens driving part 111 according to a control command from a microcomputer 107.

A shooting element 102 is provided close to a position where the shooting lens 101 forms the shot object image on an optical axis of the shooting lens 101. The shooting element 102 functions as a shooting part for shooting the shot object image and obtaining the shot image data. Photodiodes constituting all pixels are configured on the shooting element 102 in a two-dimensional matrix. Various photodiodes generate the photoelectric conversion current corresponding to light absorption, and the photoelectric conversion current is charge accumulated by a capacitor connected with various photodiodes. A front surface of each pixel is configured with a RGB filter in Bayer arrangement.

The shooting element 102 is connected with a shooting circuit 103. The shooting circuit 103 performs charge accumulation control and image signal readout control in the shooting element 102, performs waveform shaping after performing reset noise reduction to the read-out image signal (analog image signal), and then performs gain improvement and the like to form a proper signal level.

The shooting lens 101, the shooting element 102, the shooting circuit 103, the lens driving part 111 and the lens driving control part 112 cooperate with each other, which is mainly used for collecting the image data. The function implemented by the above-identified elements is similar to that of the image acquisition module 301, wherein the image acquisition module is arranged to continuously capture a sequence of images.

It should be noted that the image acquisition module 301 can be divided into multiple elements for implementation.

The shooting circuit 103 is connected with an A/D conversion part 104, and the A/D conversion part 104 performs analog-to-digital conversion to the analog image signal and outputs a digital image signal (hereinafter referred to as image data) to a bus 199.

The bus 199 is a transmission path for transmitting various data read out or generated in the interior of the camera. The bus 199 is connected with the A/D conversion part 104 and is also connected with an image processor 105, a JPEG processor 106, the microcomputer 107, an SDRAM (Synchronous DRAM) 108, a memory interface (hereinafter referred to as memory I/F) 109 and an LCD (Liquid Crystal Display) driver 110.

The image processor 105 performs various image processing such as OB subtraction processing, white balance adjustment, color matrix operation, gamma conversion, color difference signal processing, noise removal processing, synchronization processing and edge processing to the output image data based on the shooting element 102.

The function of the image processor 105 is similar to that of the image synthesis module 302 and base image determination module 303.

The image synthesis module 302 is arranged to: obtain a current captured image and determine a Light Painting region based on a predetermined criteria of the current captured image; and extract the Light Painting region in the current captured image and merge the Light Painting region and a corresponding position of a base image to generate a synthesized image.

The base image determination module 303 is arranged to: if the current captured image is a first captured image, determine the current captured image as a base image; and if the current captured image is not the first captured image, use a previous synthesized image generated by the image synthesis module as a base image for next image synthesis.

It should be noted that the image synthesis module 302 and the base image determination module 303 may be integrated in the image processor 105 for implementation.

When recording the image data in a recording medium 115, the JPEG processor 106 compresses the image data read out from the SDRAM 108 according to a JPEG compression mode. In addition, the JPEG processor 106 performs decompression of the JPEG image data in order to realize image reproduction display. During decompression, a file recorded in the recording medium 115 is read out, and after decompression processing is implemented in the JPEG processor 106, the decompressed image data are temporarily stored in the SDRAM 108 and are displayed on the LCD 116. In addition, in this embodiment, a JPEG mode is used as an image compression and decompression mode; however, the image compression and decompression mode is not limited thereto. Certainly, other compression and decompression modes such as MPEG, TIFF and H.264 may also be adopted.

The microcomputer 107 functions as a control part of the entire camera and uniformly controls various processing sequences of the camera. The microcomputer 107 is connected with an operating unit 113 and a flash memory 114.

The operating unit 113 includes but is not limited to a solid key or a virtual key, the solid or virtual key may be an operating part, e.g., various input buttons and various input keys such as a power button, a shooting key, an editing key, a dynamic image button, a reproduction button, a menu button, a cross key, an OK button, a deletion button and an amplification button, and the operating state of these operating parts is detected.

A detection result is output to the microcomputer 107. In addition, a front surface of the LCD 116 used as a display part is provided with a touch panel, detecting a touch position of a user and outputting the touch position to the microcomputer 107. The microcomputer 107 executes various processing sequences corresponding to the operation of the user according to the detection result from the operating part of the operating unit 113. (Similarly, it may be changed as that the computer 107 executes various processing sequences corresponding to the operation of the user according to the detection result of the touch panel in the front of the LCD 116).

The flash memory 114 stores a program for executing various processing sequences of the microcomputer 107. The microcomputer 107 performs the control of the entire camera according to the program. In addition, the flash memory 114 stores various adjustment values of the camera, and the microcomputer 107 reads out an adjustment value to perform the control of the camera according to the adjustment value.

SDRAM 108 is an electrically alterable, volatile memory used for temporarily storing image data. The SDRAM 108 temporarily stores the image data output from the A/D conversion part 104 and the image data obtained after processing in the image processor 105, the JPEG processor 106 and the like.

The memory interface 109 is connected with the recording medium 115 and performs control of writing and reading the image data and data such as file headers attached to the image data in and out of the recording medium 115. The recording medium 115, for example, is but not limited to a recording medium such as a memory card that can be freely mounted and dismounted on a camera body, and may also be a hard disk and the like built in the camera body.

The LCD driver 110 is connected with the LCD 116, and the image data processed by the image processor 105 are stored in the SDRAM, and when needing to be displayed, the image data stored in the SDRAM are read and displayed on the LCD 116, or, the image data compressed by the JPEG processor 106 are stored in the SDRAM, and when the image data need to be displayed, the JPEG processor 106 reads the compressed image data in the SDRAM and then performs decompression, and the decompressed image data are displayed through the LCD 116.

The LCD 116 is configured on a back surface and the like of the camera body, for image display. The LCD 116 is provided with a touch panel for detecting a touch operation of the user. In addition, as a display part, what is configured in this embodiment is but not limited to a liquid display panel (LCD 116), and other various display panels such as an organic EL panel may also be adopted.

In several embodiments provided by the present disclosure, it should be understood that the disclosed devices and methods may be implemented by other means. The device embodiment described above is just exemplary, for example, the division of the units is just logical function division, and there may be other division methods during actual implementation, e.g., a plurality of units or components may be combined or may be integrated in another system, or some features may be neglected or not executed. In addition, the coupling or direct coupling, or communication connection between the displayed or discussed components may be indirect coupling or communication connection via some interfaces, devices or units, and may be electrical, mechanical or in other forms.

The above units as discrete parts may be or may also not be physically separated; parts displayed as units may be or may also not be physical units, i.e. may be located at the same location, and may also be distributed on a plurality of network units; and part or all of the units may be selected according to actual needs to realize the purpose of the solution of the embodiment.

In addition, various function units in the various embodiments of the present disclosure may be fully integrated in one processing unit, and each unit may also be used as one unit respectively, and two or more units may also be integrated in one unit; and the integrated units may be implemented in the form of hardware and may also be implemented in the form of hardware plus software function units.

One skilled in the art can understand that all or part of the steps for implementing the above-mentioned method embodiments may be completed by relevant hardware instructed by a program, and the program may be stored in a computer-readable storage medium, and when the program is executed, the steps including the above-mentioned method embodiments are executed; and the foregoing storage medium includes various mediums capable of storing program codes, such as a mobile storage device, a Read-Only Memory (ROM), a Random Access Memory (RAM), a magnetic disk or a compact disk.

Or, if the above integrated units in the present disclosure are implemented in the form of software function modules and are sold or used as independent products, the units may also be stored in a computer-readable storage medium. Based on such understanding, the technical solution of the embodiments of the present disclosure substantially or the portion that makes a contribution to the prior art may be reflected in the form of software product, the computer software product is stored in a storage medium and includes a plurality of instructions for making a computer device (which may be a personal computer, a server or a network device) execute all or part of the steps of the method provided by each embodiment of the present disclosure. The foregoing storage medium includes various mediums capable of storing program codes, such as a mobile storage device, a ROM, a RAM, a magnetic disk or a compact disk.

The embodiments of the present disclosure are described with reference to accompanying drawings, but are not intended to limit the protection scope of the present disclosure. One skilled in the art may have various variation solutions to implement the present disclosure without departing from the scope and essence of the present disclosure, e.g., features of one embodiment may be applied to another embodiment to obtain yet another embodiment.

Any variation, equivalent replacement and improvement made within the technical concept of the present disclosure shall be also included in the protection scope of the present disclosure.

INDUSTRIAL APPLICABILITY

In the shooting method provided by the technical solution of the present disclosure, the assistant object or the Light Painting light spot is tracked, the Light Painting region in the image is recognized according to the assistant object or the Light Painting light spot, and finally the Light Painting region is extracted to perform superposition synthesis. Since only the Light Painting region is merged and synthesized, and other light spot regions in the image would not appear in the synthesized image, and would not contaminate the synthesized image, a clear Light Painting trajectory can be recorded in the finally synthesized image, achieving Light Painting shooting under a bright shooting environment, widening the application scenarios of Light Painting shooting, satisfying the demand of a user for Light Painting creation anytime and anywhere, and improving the user experience. Therefore, the present disclosure has very strong industrial applicability.

What we claim is:

1. A shooting method, comprising:
continuously, capturing a sequence of images;
obtaining a current captured image;
when the current captured image is the first captured image, determining a Light Painting region of the current captured image based on a predetermined criteria of a Light Painting light spot and a predetermined position of a Light Painting region or a user-specified position of a Light Painting region; wherein the step of determining a Light Painting region of the current captured image according to a predetermined criteria of a Light Painting light spot and a predetermined position of a Light Painting region or a user-specified position of a Light Painting region comprises: searching, in the current captured image, for all Light Painting light spots matching with the predetermined criteria of the Light Painting light spot within a predetermined range of a position corresponding to the predetermined position of the Light Painting region or the user-specified position of the Light Painting region, and determining a region where the all Light Painting light spots are located as the Light Painting region; and
when the current captured image is not the first captured image, determining the Light Painting region of the current captured image according to the predetermined criteria of the Light Painting light spot and a stored position of a previous Light Painting region;
extracting the Light Painting region from the current captured image, merging the Light Painting region and a corresponding position of a base image to generate a synthesized image, and using the synthesized image as a base image for next image synthesis;
wherein, if the current captured image is the first captured image, the current captured image is used as a base image.

2. The shooting method according to claim 1, wherein the step of determining a Light Painting region based on a predetermined criteria of the current captured image comprises:
searching for an assistant object based on a predetermined assistant object criteria in the current captured image; and
identifying a light spot region at a light-emitting position of the assistant object as the Light Painting region.

3. The shooting method according to claim 2, wherein the step of determining a light spot region at a light-emitting position of the assistant object as the Light Painting region comprises:
comparing brightness value of a region close to the light-emitting position with brightness value of the base image, and if a difference value between the brightness value of the region close to the light-emitting position and the brightness value of the base image is greater than a predetermined threshold value, determining the region close to the light-emitting position as the "light spot region" and determining the region as the Light Painting region.

4. The shooting method according to claim 1, wherein the step of determining the Light Painting region of the current captured image according to the predetermined criteria of the Light Painting light spot and a stored position of a previous Light Painting region comprises:
searching, in the current captured image, for all Light Painting light spots matching with the predetermined criteria of the Light Painting light spot within a predetermined range of a position corresponding to the position of the previous Light Painting region, and determining a region where the all Light Painting light spots are located as the Light Painting region.

5. A shooting device, comprising a processor and a memory, wherein the memory stores processor-executable programs, and the programs comprise an image acquisition module, an image synthesis module and a base image determination module, wherein:
the image acquisition module is arranged to continuously capture a sequence of images;
the image synthesis module is arranged to: obtain a current captured image; when the current captured image is the first captured image, determine a Light Painting region of the current captured image according to a predetermined criteria of a Light Painting light spot and a predetermined position of a Light Painting region or a user-specified position of a Light Painting region; and
when the current captured image is not the first captured image, determine the Light Painting region of the current captured image according to the predetermined criteria of the Light Painting light spot and a predetermined position of a previous Light Painting region;
wherein the image synthesis module is arranged to determine the Light Painting region of the current captured image according to the predetermined criteria of the Light Painting light spot and the predetermined position of the Light Painting region or the user-specified position of the Light Painting region in a way as follows:

searching, in the current captured image, for all Light Painting light spots matching with the predetermined criteria of the Light Painting light spot within a predetermined range of a position corresponding to the predetermined position of the Light Painting region or the user-specified position of the Light Painting region, and determining a region where the all Light Painting light spots are located as the Light Painting region;

the base image determination module is arranged to: if the current captured image is a first captured image, determine the current captured image as a base image; and if the current captured image is not the first captured image, use a previous synthesized image generated by the image synthesis module as a base image for next image synthesis.

6. The shooting device according to claim 5, wherein the image synthesis module is arranged to determine a Light Painting region based on a predetermined criteria of the current captured image in a way as follows:

searching for an assistant object matching with the predetermined criteria of the assistant object in the current captured image; and identifying a light spot region at a light-emitting position of the assistant object as the Light Painting region.

7. The shooting device according to claim 6, wherein the image synthesis module is arranged to determine the light spot region at the light-emitting position of the assistant object as the Light Painting region in a way as follows:

comparing brightness value of a region close to the light-emitting position with brightness value of the base image, and if a difference value between the brightness value of the region close to the light-emitting position and the brightness value of the base image is greater than a predetermined threshold value, determining the region close to the light-emitting position as the "light spot region" and determining the region as the Light Painting region.

8. The shooting device according to claim 5, wherein the image synthesis module is arranged to determining the Light Painting region of the current captured image according to the predetermined criteria of the Light Painting light spot and the stored position of the previous Light Painting region in a way as follows:

searching, in the current captured image, for all Light Painting light spots matching with the predetermined criteria of the Light Painting light spot within a predetermined range of a position corresponding to the position of the previous Light Painting region, and determining a region where the all Light Painting light spots are located as the Light Painting region.

9. A non-transitory carrier carrying a computer program executed by a computer, enabling the computer to execute the shooting method according to claim 1.

* * * * *